Figure 1:
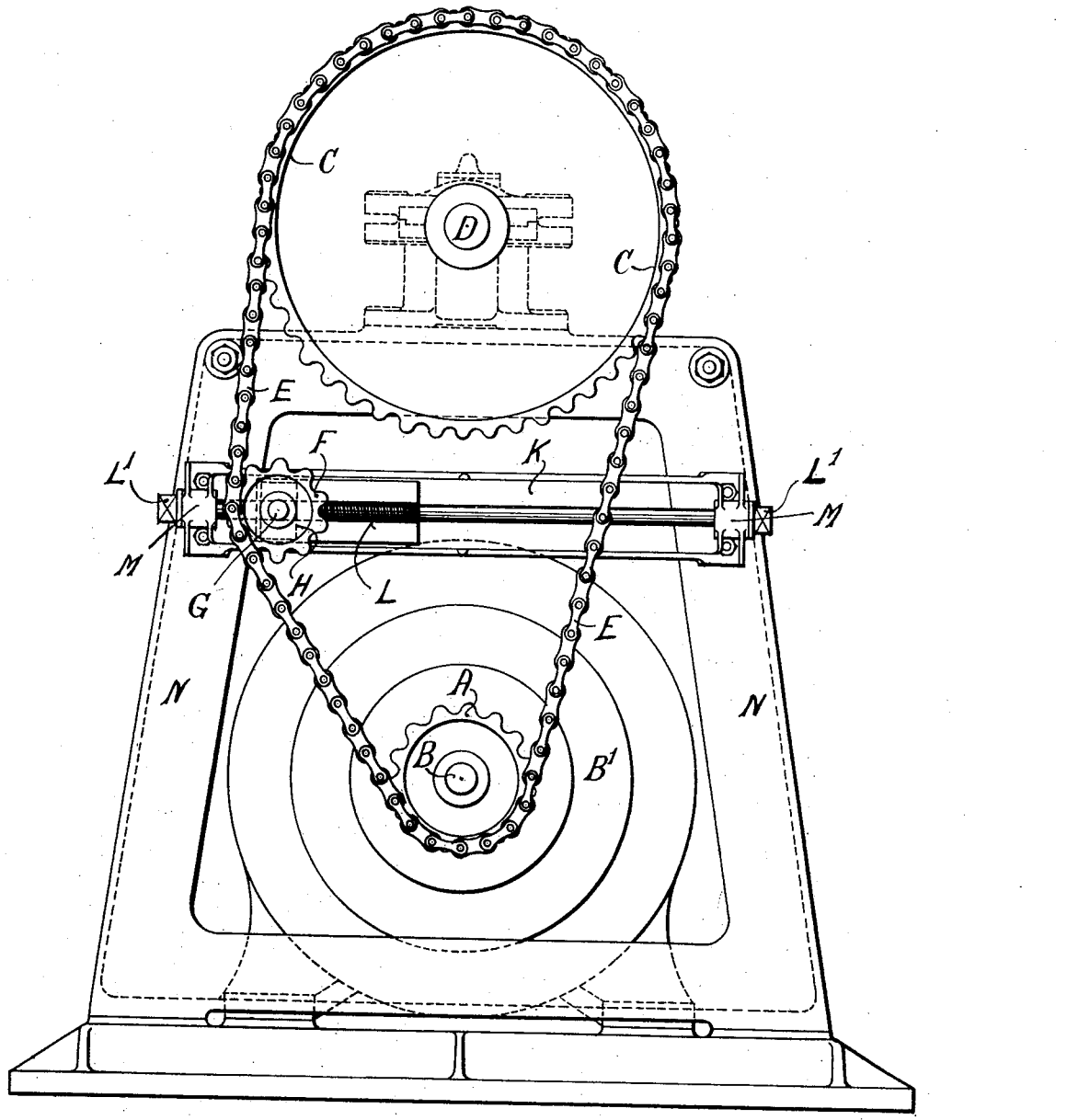

No. 771,233. PATENTED OCT. 4, 1904.
S. C. DAVIDSON.
CHAIN DRIVING GEAR.
APPLICATION FILED APR. 30, 1904.
NO MODEL. 3 SHEETS—SHEET 1.

WITNESSES
Fred White
René Bruine

INVENTOR:
Samuel Cleland Davidson,
By his Attorneys
Arthur E. Fraser & Co.

No. 771,233. PATENTED OCT. 4, 1904.
S. C. DAVIDSON.
CHAIN DRIVING GEAR.
APPLICATION FILED APR. 30, 1904.
NO MODEL. 3 SHEETS—SHEET 3.

WITNESSES: INVENTOR:
Samuel Cleland Davidson,
By his Attorneys

No. 771,233.

Patented October 4, 1904.

UNITED STATES PATENT OFFICE.

SAMUEL CLELAND DAVIDSON, OF BELFAST, IRELAND.

CHAIN DRIVING-GEAR.

SPECIFICATION forming part of Letters Patent No. 771,233, dated October 4, 1904.

Application filed April 30, 1904. Serial No. 205,672. (No model.)

*To all whom it may concern:*

Be it known that I, SAMUEL CLELAND DAVIDSON, merchant, a subject of the King of Great Britain and Ireland, residing in Belfast, Ireland, have invented certain new and useful Improvements in Chain Driving-Gear, of which the following is a specification.

This invention relates to chain driving-gear, and particularly where the chain drives from one sprocket-wheel to another and the centers between the said driving and driven wheels are fixtures and the distance between the centers is comparatively short, and especially where a considerable difference exists between the diameters of the said sprocket-wheels. There has always been hitherto great objection to the employment of chain-gear under such conditions for the reason that where the chain laps round the larger of the two wheels farther than a half-circle of the wheel the teeth of the driving-sprocket have a tendency to catch the leading ends of the chain-links before they get clear of the wheel and the teeth of the driven sprocket engage the ends of the links too soon, which causes them to ride up on the teeth, and the further the chain laps round the wheel beyond a half-circle the greater this tendency becomes until the chain so clings to the teeth that the drive becomes defective and the chain soon wears out. This tendency is particularly noticeable where the smaller sprocket is the driving-sprocket.

It is the object of this invention to enable chain-gear to be employed under such conditions without the objections and defects above mentioned. To this end and in accordance with this invention I locate between the respective sprocket-wheels a jockey pulley or wheel, (which is also preferably a sprocket-wheel,) which jockey-wheel is made adjustable as to its position and is adapted to be placed and held in such position against or in engagement with the inner face of the slack side of the chain that the part of said chain between the jockey-pulley and the larger sprocket-wheel is approximately parallel with or makes a divergent angle with a line drawn between the centers of the driving and driven wheels, so that the lap of the chain around the larger sprocket is a half or less than half of the circumference of the same, whereby the gear-chain feeds on to and from the teeth of both sprocket-wheels freely and the chain runs without jar and very silently and wears well. It is obvious that when the links wear away a little and the chain thereby lengthened the jockey-pulley can be at once adjusted to take up the slack and still maintain the required conditions.

I have illustrated one application of my invention in the accompanying drawings, wherein—

Figure 2:
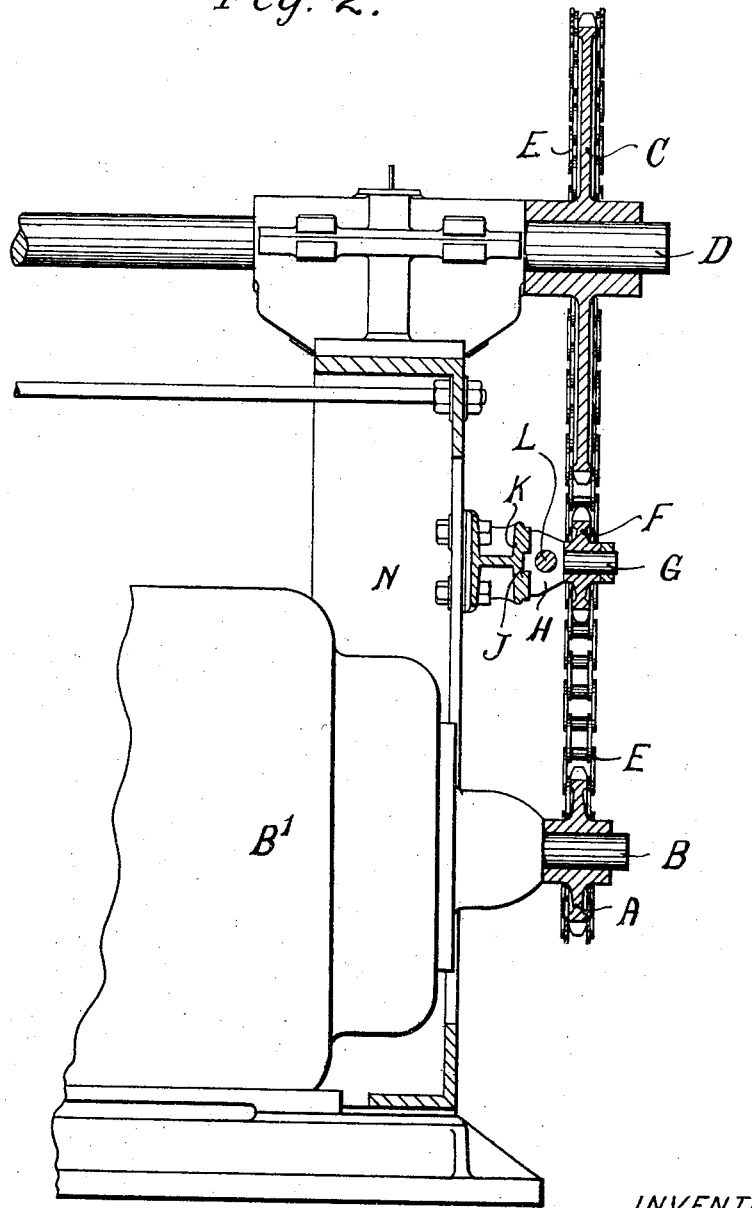
Figure 3:
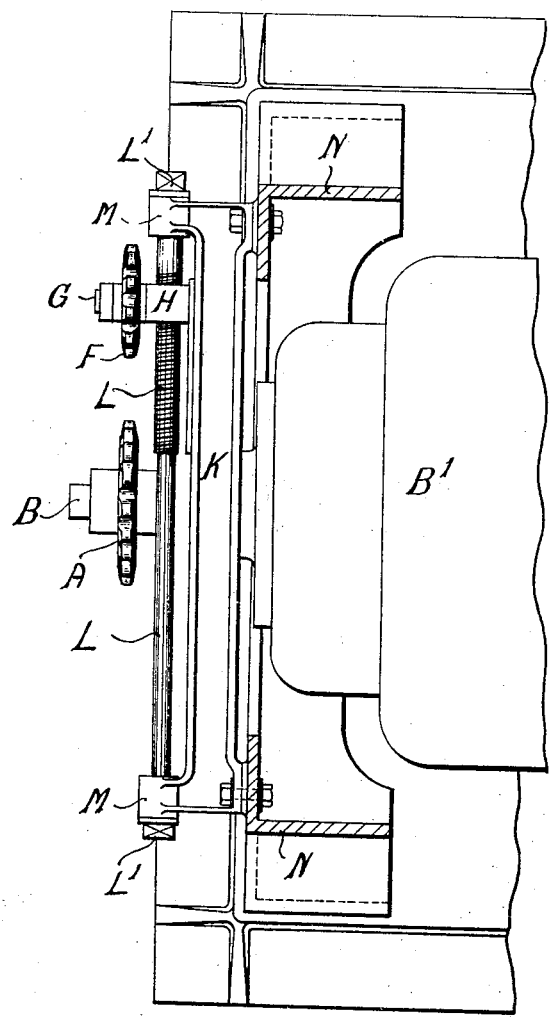

Figure 1 is a face elevation of the gear. Fig. 2 is a side elevation; and Fig. 3 is a horizontal section just above the jockey-pulley, the chain being omitted.

Referring to the drawings, A is the driving sprocket-wheel mounted on a shaft B, driven by an electric motor B'.

C is the driven sprocket-wheel mounted on the driven shaft D.

E is the gear-chain passing over the sprocket-wheels A and C.

F is the jockey-pulley located in the intermediate space between the tight and slack sides of the chain E and mounted in the same manner as a loose pulley upon a stud G, fixed to a base H, which slides in a groove J, formed in or upon a suitable frame or cross-bracket K. The said base H is adapted to be slid transversely to a line between the centers of the two sprocket-wheels and is traveled in the groove J by means of a screw L, which passes through the same base part H and is carried in bearings M M at the ends of the cross-bracket K and fitted with a squared part L' for operation by a suitable operating-handle. The bracket K is mounted in any convenient way upon the stand or bracket N, carrying the bearings of either or both the driving or driven sprocket-wheels A and C.

The drawings show the sprocket-wheel C of much larger dimensions than the wheel A, and the centers are close together for a chain drive, so that the purpose, utility, and application of the invention will be apparent.

In use, assuming the chain E is of sufficient length to allow it to just slip over the teeth of the driving and driven sprocket-wheels A and C, the centers of which are fixtures, the adjusting-screw L of the jockey-pulley F is then rotated and brings the same into contact with the inner face of the slack side of the gear-chain E, and so pushes it outward beyond its straight-line position tangent to the two wheels to the position shown in Fig. 1 or until the required amount of slack is taken up, by doing which the extent of lap of the chain around the sprocket-wheels, especially the larger one A, is shortened, so that with a very slack chain it would be less than half the circumference of said sprocket-wheel. When the chain wears slack, a slight turn of the adjusting-screw L of the jockey-pulley is all that is necessary to rectify same.

What I claim, and desire to secure by Letters Patent, is—

1. A chain driving-gear including in combination a driving-sprocket and a driven sprocket of considerably different diameters, the distance between the centers of said sprockets being comparatively short, and a jockey-wheel in the intermediate space between the tight and slack sides of the chain and between the sprockets and engaging the inner face of the slack side of the chain, said jockey-wheel being adjustable transversely to a line between the centers of the sprockets, whereby said slack side of the chain may be given a substantial lateral movement outward beyond a straight-line position to lessen substantially its degree of contact with both said sprockets.

2. A chain driving-gear including in combination a driving-sprocket and a driven sprocket of considerably different diameters, the distance between the centers of said sprockets being comparatively short, a jockey-wheel in the intermediate space between the tight and slack sides of the chain and between the two sprockets and engaging the inner face of the slack side of the chain, a stud on which said jockey-pulley rotates, a base part carrying said stud, a guide in which said base part is adapted to slide, said guide being disposed transversely to a line between the centers of the sprocket-wheels, and means for traveling said base in said slide whereby said slack side of the chain may be given a substantial lateral movement outward beyond a straight-line position to lessen substantially its degree of contact with both said sprockets.

3. A chain driving-gear including in combination a driving-sprocket and a driven sprocket of considerably different diameters, the distance between the centers of said sprockets being comparatively short, a jockey-wheel in the intermediate space between the tight and slack sides of the chain and between the two sprockets and engaging the inner face of the slack side of the chain, a stud on which said jockey-pulley rotates, a base part carrying said stud, a guide in which said base part is adapted to slide, said guide being disposed transversely to a line between the centers of the sprocket-wheels, and a screwed spindle held against longitudinal movement and passing through a corresponding threaded hole in the said sliding base part, the rotation of said screw serving to slide the base part and the jockey-pulley in the guide and adjust the position of said jockey-pulley, whereby said slack chain may be given a substantial lateral movement outward beyond a straight-line position to lessen substantially its degree of contact with both said sprockets.

4. A chain driving-gear including in combination a driving-sprocket and a driven sprocket of considerably different diameters, the distance between the centers of said sprockets being comparatively short, a jockey-wheel in the intermediate space between the tight and slack sides of the chain and between the two sprockets and engaging the inner face of the slack side of the chain, a stud on which said jockey-pulley rotates, a base part carrying said stud, a guide in which said base part is adapted to slide, said guide being disposed transversely to a line between the centers of the sprocket-wheels, a screwed spindle passing through a corresponding threaded hole in the said sliding base part, a bracket carrying said guide, and bearings for said screwed spindle in the ends of said bracket, there being a squared end to said spindle whereby the same may be rotated to adjust the position of the jockey-pulley and move the same into engagement with the inner face of the slack side of the gear-chain, whereby said slack side of the chain may be given a substantial lateral movement outward beyond a straight-line position to lessen substantially its degree of contact with both said sprockets.

5. A chain driving-gear including in combination a smaller driving-sprocket A, a driven sprocket C of considerably larger diameter, the distance between the centers of said sprockets being comparatively short, and a jockey-wheel F in the intermediate space between the tight and slack sides of the chain and between the two sprockets A and C and engaging the inner face of the slack side of the chain, said jockey-wheel being adjustable transversely to a line between the centers of said sprockets whereby said slack side of the chain may be given a substantial lateral movement outward beyond a straight-line position to lessen substantially its degree of contact with both said sprockets.

6. A chain driving-gear including in combination a smaller driving-sprocket A, a driven sprocket C of considerably larger diameter, the distance between the centers of said sprockets being comparatively short, and a jockey-wheel F in the intermediate space between the tight and slack sides of the chain and between the two sprockets A and C and engaging the inner face of the slack side of the chain, a sliding base part H carrying said jockey-pulley, a guide K upon which said base part slides, said guide being disposed transversely to a line between the centers of the sprocket-wheels, and means for traveling said base in said slide, whereby the slack side of the chain may be given a substantial lateral movement outward beyond a straight-line position to lessen substantially its degree of contact with both said sprockets.

In witness whereof I have hereunto signed my name in the presence of two subscribing witnesses.

SAMUEL CLELAND DAVIDSON.

Witnesses:
   GEORGE GOOLD WARD,
   EDWARD FERGUSON.